March 7, 1967  R. ALLENBAUGH  3,308,317
PORTABLE ELECTRIC HAND TOOL WITH A MOISTURE REPELLANT COVER
Filed March 11, 1964  2 Sheets-Sheet 1
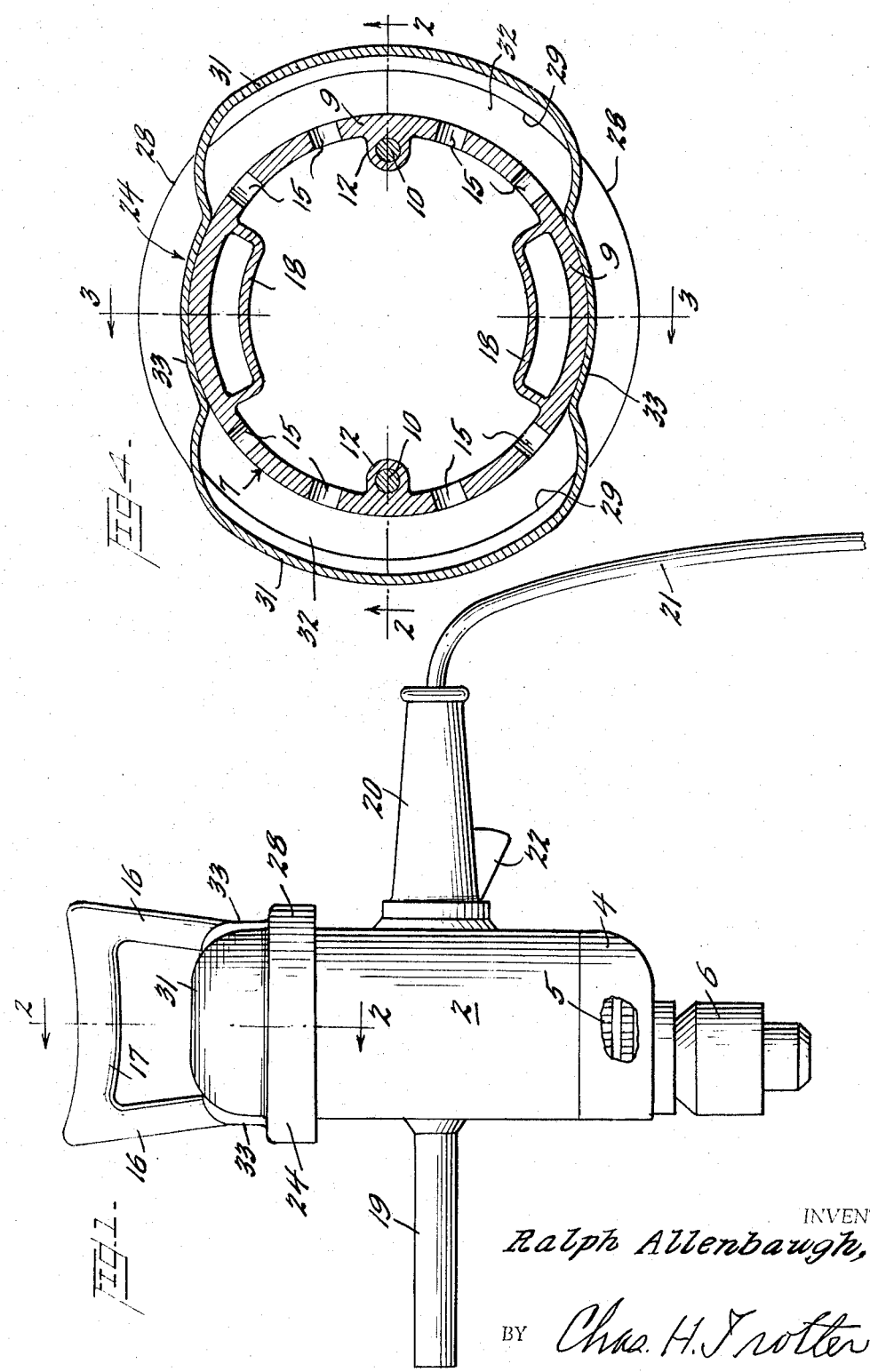
INVENTOR
Ralph Allenbaugh,
BY Chas. H. Trotter
ATTORNEY

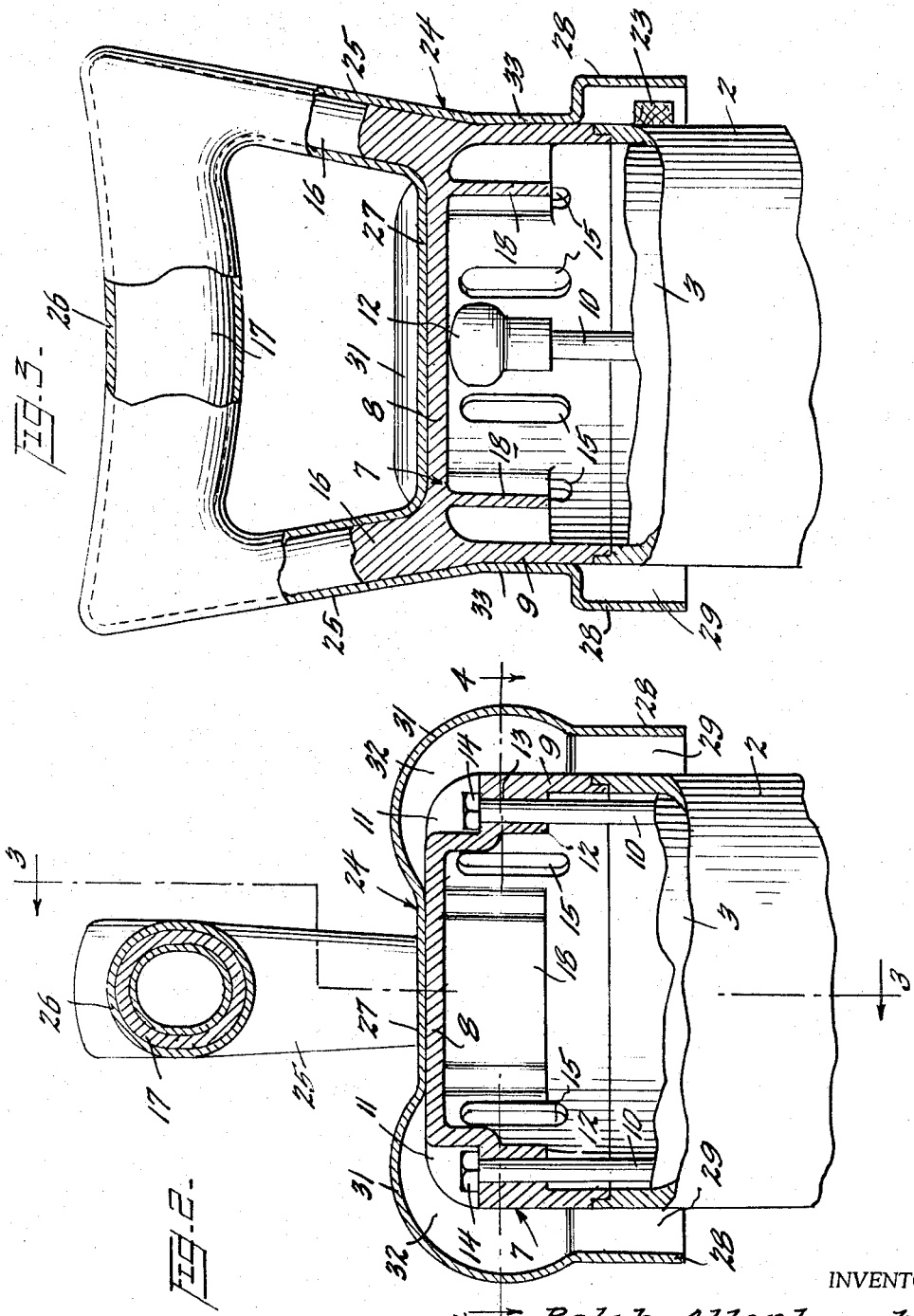

United States Patent Office 3,308,317
Patented Mar. 7, 1967

3,308,317
PORTABLE ELECTRIC HAND TOOL WITH A
MOISTURE REPELLANT COVER
Ralph Allenbaugh, 717 Maple St.,
Mansfield, Ohio 44906
Filed Mar. 11, 1964, Ser. No. 351,186
1 Claim. (Cl. 310—88)

This invention relates generally to portable electric power units such as are used for actuating drills, buffers, sanders and various other types of tools. Power units of this type are also currently extensively used as the driving means in power actuating hoisting mechanisms for swing stage scaffolds such as shown in U.S. Patent No. 2,938,707, which was issued to me on May 31, 1960.

Mechanisms of this type generally comprise an elongated cylindrical casing in which a high speed reversible electric motor is suitably secured. The motor is operatively connected to a speed reduction gearing which is mounted in a housing which is secured to the lower end of the casing. The speed reduction gear is operatively connected to a chuck in which various different tools are adapted to be removably secured.

The upper end of the casing is closed by a removable cap having a hand-grip which is integral therewith and is disposed in vertically spaced relation thereto. Breather means must be provided for the escape of hot air from the casing as otherwise the motor would overheat and be damaged. To this end the cap is provided with a plurality of annularly spaced slots which extend through the side wall thereof.

Power mechanisms of this type are frequently used and/or left outdoors where they are at times subjected to rain or snow and freezing temperatures. Any moisture entering the motor casing through the cap slots is likely to damage the motor by "shorting" if the device is being used, or by freezing therein when the device is not being used.

It is therefore the principal object of this invention to provide means which will prevent the entrance of moisture into the casing while permitting it to breathe freely. To this end I provide the cap with a moisture proof plastic cover which is molded to the hand-grip and the central portion of the cap and extends downwardly about the side wall of the cap in spaced relation thereto. If desired the plastic cover may be variously brightly colored to give the mechanism a distinctive appearance.

Having stated the principal object of the invention, other and more specific objects of the invention will be apparent from the following specification and the accompanying drawings forming a part thereof in which:

FIG. 1 is a front elevation of a portable electric power unit having my invention applied thereto;

FIG. 2 is an enlarged vertical sectional view taken on the line 2—2 on FIG. 1;

FIG. 3 is a vertical sectional view taken on the line 3—3 on FIG. 2; and

FIG. 4 is a horizontal sectional view taken on the line 4—4 on FIG. 1 looking in the direction of the arrows.

The power unit of the present invention having been generally described it will now be specifically described in connection with the drawings by the use of reference characters. The power unit, which is generally indicated by the numeral 1, comprises an elongated cylindrical casing 2 having a high speed reversible electric motor 3 secured in fixed position therein. A gear box 4 having a conventional speed reduction gearing 5 mounted therein is secured to the lower end of the casing 2. The speed reduction gearing 5 is operatively connected to the motor 3 and to a chuck 6 in which various types of tools are adapted to be removably secured.

An inverted cup shaped cap 7 having a top wall 8 and a downwardly extending annular wall 9 is removably secured to the open upper end of the casing 2 by a pair of bolts 10. The annular side wall 9 of the cap 7 is indented at diametrically opposite points as indicated at 11. A pair of bosses 12 which are integral with the side wall 9 and extend inwardly from the inner surface of the wall 9 below the indentations 11 are provided with bores 13 in which the bolts 10 are mounted with the heads 14 thereof disposed within the indentations 11. The annular side wall 9 of the cap 7 is provided with a plurality of vertically disposed annularly spaced breather slots 15 through which cooling air is adapted to be circulated through and about the motor 3. A pair of spaced diametrically disposed arms 16, which are integral with the cap 7 and extend upward and outwardly therefrom, terminate in a hand-grip 17 which is integral therewith and extends between the upper ends thereof. The interior of the cap 7 is also provided with a pair of diametrically disposed integral abutments 18 by which the motor 3 is clamped in position.

The casing 2, intermediate the upper and lower ends thereof, is provided with a pair of opposed diametrically aligned handles 19 and 20 by which the power unit 1 is adapted to be manually held and pressure applied thereto during operation. Current is supplied to the motor 3 through a cable 21 which extends into the casing 2, for connection to the motor 3, through an axial bore in the handle 20. A control switch 22 is incorporated in the handle 20, and a reversing switch 23 is mounted on the casing 2 adjacent the upper end thereof.

As previously stated power units of the aforesaid type are frequently used and/or left outdoors when they are subjected to all kinds of weather including rain and snow or a mixture thereof. Unless means are provided to prevent it, rain or snow will enter the casing 2, through the breather slots 15 in the cap 7, which is liable to damage the motor 3 by causing shorts therein. Also in freezing weather any rain or snow within the casing 2 will freeze about the motor and prevent operation thereof. I therefore provide means, which constitutes the subject matter of this invention, which will prevent the entrance of rain or snow into the casing 2, through the breather slots 15 in the cap 7, without interferring with the breathing of the unit through the slots 15.

For this purpose I encase the cap 7 within a thin generally cup shaped molded cover 24 of moisture proof flexible plastic material which is permanently secured to the cap 7. The cover 24 comprises the upwardly extending tubular sections 25 which are molded around and in adhering engagement within the hand grip 17, and a flat top section 27 which is molded to the top wall 8 of the cap 7. The cover 24 also includes an annular skirt 28 which is disposed about the side wall 9 of the cap 7 in spaced relation thereto thereby providing a passageway 29 between the outer surface of the wall 9 and the inner surface of the skirt 28. The skirt 23 extends down below the lower open end of the side wall 9 of the cap to thereby encompass the junction 30 of the cap 7 with the open upper end of the casing 2 when the cap 7 is secured to the casing 2. The upper end of the skirt 28 is connected to the flat top section 27 by a pair of diametrically opposed outwardly and upwardly curved similar sections 31 which define a pair of enlarged chambers 32 which communicate with the passageway 29 and with which the breather slots 15 communicate. The sections 31 and the chambers 32 extend partially around the cap 7 symmetrically about a medial plane. The adjacent ends of the sections 31, the top section 27 and the skirt 28 are all connected together by a pair of similar intermediate sections 33 which are disposed in contact with the side wall 9 of the cap 7. It will therefore be apparent that when the device is maintained in normal substantially vertical position that the cover 24 will shed any moisture impinging thereon, and that cooling air can freely enter the casing 2 through the passageway 29, the chambers 32, and the breather slots 15.

Through the specification and the following claim the term "moisture" is used to denote rain or snow or a mixture thereof, but not moisture laden air.

From the foregoing it will be apparent to those skilled in this art that I have provided a very simple and efficient means for accomplishing the objects of the invention.

It is to be understood that I am not limited to the specific construction shown and described herein as various modifications may be made therein within the spirit of the invention and the scope of the appended claim.

I claim:

A portable electric power unit of the character described comprising an elongated casing open at the upper end thereof, an electric motor secured within said casing, a cup shaped cap which is removably secured to the open upper end of said casing; said cap comprising a top wall and an integral downwardly extending annular side wall having a plurality of annularly spaced breather slots therein, and a hand-grip which is disposed above said top wall in vertically spaced relation thereto and is connected to said top wall by a pair of laterally spaced upwardly extending arms between the upper ends of which said hand-grip is connected; a thin flexible moisture repellant plastic cover which is applied to said cap and comprises a flat mid-section which is molded to said top wall in adhering contact therewith, an upper section which is integral with said mid-section and is integrally molded to and about said upwardly extending arms and said hand grip, and an annular skirt section which is integral with said mid-section and extends downwardly therefrom about the said side wall of said cap, the lower portion of said skirt being spaced from the said side wall thereby providing an annular space between said side wall and the said lower portion of said skirt, the upper portion of said skirt being provided with diametrically opposed sections which are disposed in adhering contact with said side wall and are connected together by a pair of similar intermediate sections which curve outwardly and upwardly from the said lower portion of said skirt into the said mid-section of said cover and define a pair of diametrically opposed chambers with which both said annular space and said breather slots communicate, said skirt section being operative to prevent the entrance of moisture into said casing through said breather slots while permitting the free flow of air into and out of said casing through said annular space, said chamber and said breather slots.

References Cited by the Examiner

UNITED STATES PATENTS

| | | | |
|---|---|---|---|
| Re. 20,604 | 12/1937 | Haldeman | 310—89 |
| 1,664,540 | 4/1928 | Chryst | 310—89 |
| 2,694,157 | 11/1954 | Cone | 310—89 |
| 2,743,385 | 4/1956 | Patter | 310—88 X |
| 2,776,385 | 1/1957 | Modrey | 310—50 |
| 2,777,963 | 1/1957 | Kuntz | 310—157 X |
| 2,976,436 | 3/1961 | Anton | 310—50 |
| 3,077,340 | 2/1963 | Jepson | 310—50 |
| 3,114,061 | 12/1963 | Michael | 310—89 |
| 3,121,178 | 2/1964 | Seyfried | 310—50 |
| 3,210,577 | 10/1965 | Hague | 310—88 X |

MILTON O. HIRSHFIELD, *Primary Examiner.*

J. W. GIBBS, *Assistant Examiner.*